(12) United States Patent
Chapman et al.

(10) Patent No.: US 10,316,877 B2
(45) Date of Patent: Jun. 11, 2019

(54) SECURING DEVICE

(71) Applicant: GRIPPLE LIMITED, Sheffield (GB)

(72) Inventors: Robert Ernest Chapman, South Yorkshire (GB); Lee Mark Giemza, West Yorkshire (GB)

(73) Assignee: GRIPPLE LIMITED (GB)

( * ) Notice: Subject to any disclaimer, the term of this patent is extended or adjusted under 35 U.S.C. 154(b) by 145 days.

(21) Appl. No.: 15/501,106

(22) PCT Filed: Aug. 6, 2015

(86) PCT No.: PCT/GB2015/000231
§ 371 (c)(1),
(2) Date: Feb. 1, 2017

(87) PCT Pub. No.: WO2016/024075
PCT Pub. Date: Feb. 18, 2016

(65) Prior Publication Data
US 2017/0227036 A1  Aug. 10, 2017

(30) Foreign Application Priority Data

Aug. 11, 2014  (GB) .................................. 1414162.6
Jul. 30, 2015  (GB) .................................. 1513394.5

(51) Int. Cl.
*F16B 13/06* (2006.01)
*F16B 13/08* (2006.01)
*F16B 5/02* (2006.01)
*F16B 2/10* (2006.01)

(52) U.S. Cl.
CPC ............ *F16B 13/08* (2013.01); *F16B 5/0258* (2013.01); *F16B 13/0833* (2013.01); *F16B 2/10* (2013.01)

(58) Field of Classification Search
CPC ......... F16B 13/08; F16B 13/0833; F16B 2/10
USPC .......................... 411/8, 13, 14, 82, 82.3, 57.1
See application file for complete search history.

(56) References Cited

U.S. PATENT DOCUMENTS

| 3,108,443 A * | 10/1963 | Schuermann | E21D 20/025 206/206 |
| 4,295,761 A * | 10/1981 | Hansen | E21D 20/025 405/259.1 |
| 4,820,095 A * | 4/1989 | Mraz | E21D 20/026 405/259.6 |
| 6,676,346 B1 * | 1/2004 | Frischmann | F16B 13/065 411/32 |

(Continued)

FOREIGN PATENT DOCUMENTS

DE  10 2013 100 835 A1  7/2014

*Primary Examiner* — Gary W Estremsky
(74) *Attorney, Agent, or Firm* — Clark Hill PLC; James R. Foley

(57) ABSTRACT

A securing device (10) is mountable on an article, and comprises a guide formation (14). A fastening arrangement (18) is movable relative to the guide formation to fasten the article to the securing device. An urging arrangement (26) is operable to urge the fastening arrangement relative to the guide formation between fastening and non-fastening positions. The guide formation is arranged to guide the fastening arrangement to the fastening position. An indicator (38) is movable by the urging arrangement from a non-indicating condition to an indicating condition when the fastening arrangement is moved to the fastening position.

19 Claims, 14 Drawing Sheets

(56) References Cited

U.S. PATENT DOCUMENTS

| | | | |
|---|---|---|---|
| 8,162,577 B2* | 4/2012 | Moore | F16B 19/1072 411/57.1 |
| 8,794,888 B2* | 8/2014 | Bohnet | F16B 13/0858 411/57.1 |
| 2004/0208722 A1 | 10/2004 | Kuenzel | |
| 2005/0058521 A1* | 3/2005 | Stevenson | F16B 13/002 411/82 |

* cited by examiner

SECURING DEVICE

This invention relates to securing devices. This invention also relates to methods of using securing devices.

It is often necessary to attach articles, such as lamps, to supports, such as cables. via securing devices received in apertures in the articles. In order to do so, access may be required within the article. It is often difficult to know when the securing device is fully secured to the article.

According to one aspect of this invention, there is provided a securing device mountable on an article, the securing device comprising: a guide formation; a fastening arrangement movable relative to the guide formation to fasten the article to the securing device; an urging arrangement operable to urge the fastening arrangement relative to the guide formation between fastening and non-fastening positions; wherein the guide formation is arranged to guide the fastening arrangement to the fastening position.

According to another aspect of this invention, there is provided a securing device mountable on an article, the securing device comprising: a guide formation; a fastening arrangement movable relative to the guide formation to fasten the article to the securing device; an urging arrangement operable to urge the fastening arrangement relative to the guide formation between fastening and non-fastening positions, the guide formation being arranged to guide the fastening arrangement to the fastening position; and an indicator movable by the urging arrangement from a non-indicating condition to an indicating condition when the fastening arrangement is moved to the fastening position.

The embodiments described herein provide the advantage that the operations to secure the securing device to the article are performed outside the article.

The fastening arrangement may comprises a fastening member movable between the fastening and non-fastening positions. The fastening member may be resilient. The fastening member may be substantially V or U shaped. The fastening member may engage the article when the fastening member is in the fastening position.

The fastening member may have a flared portion, which may be urged outwardly by the guide formation when the fastening member is moved to the fastening position.

The fastening member may have opposite flared portions, each of which may be urged outwardly by the guide formation when the fastening member is moved to the fastening position. The opposite flared portions may be urged outwardly in opposite directions.

The guide formation may have opposite sloping sides for engaging the flared portions of the fastening member. The fastening member may slide along the guide formation when the fastening member moves to the fastening position.

The securing device may comprise a body. The body may comprise the guide formation.

Tightening members may be provided to assist in moving the fastening arrangement to the fastening position. The tightening members may be provided on the guide formation in alignment with the flared portions of the fastening member.

The securing device may include a web extending from the guide formation. The body may define a space through which the indicator can move when said indicator moves from the non-indicating to the indicating conditions. The body may include a side wall extending across the guide formation. The space may be defined between the side wall and the guide formation. The body may comprise a pair of opposed side walls. Two spaces may be defined between the side walls and the guide formation.

The web may extend across the space. The indicator may extend through the web when the indicator is the indicating condition. The indicator may comprise an indicating member which may extend through the web when the indicator is in the indicating condition. The indicating member may puncture the web when the indicator is in the indicating condition.

The indicator may comprise two indicating members. The body may define two spaces along each of which a respective one of the indicating members can move. A respective web may extend across each of the spaces.

The, or each, indicating member may comprise a prong. The, or each, prong may puncture the web when the indicator is moved to the indicating condition.

The securing device may comprise a pair of webs, which may be arranged on opposite sides of the guide formation. The indicator may extend through the, or each, web when the indicator is in the indicating condition. The indicator may puncture the web when the indicator is moved to the indicating condition.

The body may include an outwardly extending portion, which may extend from the, or each, web. The outwardly extending portion may engage an edge region of the article.

Said edge region may be gripped between the fastening member and the outwardly extending portion. The, or each, outwardly extending portion may comprise a radially outwardly extending flange.

The edge region may be an edge region around a hole in the article. Thus, the article may define a hole, said edge region being provided around the hole.

The indicator may comprise a pair of the indicating members, and each indicating member may extend through a respective one of the webs when the indicator is in the indicating condition. Each of the indicating members may puncture the respective web when the indicator is moved to the indicating condition.

The indicating member, or each of the indicating members, may comprise a prong. The securing device may comprise a body, which may include the guide formation. The body may further include the web. The web may comprise a cover portion of the body. The cover portion may comprise a top portion.

The indicator may comprise a support portion for supporting the, or each, indicating member. The support portion may be the urging member. Alternatively, the support portion may be disposed on the urging member.

The urging arrangement may comprise a drive arrangement and an urging member, the drive arrangement being operable to drive the urging member. The urging member may engage the fastening arrangement so that when the drive arrangement drives the urging member, the urging member may urge the fastening arrangement from the non-fastening position to the fastening position.

The drive arrangement may comprise a drive member. The urging member may be mounted on the drive member. The urging member may receive the drive member therethrough.

The fastening arrangement may be seated on the urging member. The drive member may be elongate.

The drive member may comprise a threaded member. The threaded member may be elongate, and may be externally threaded.

The drive arrangement may further include an internally threaded member threadably mounted on the drive member, the internally threaded member being configured to be driven by the drive member. The internally threaded member may comprise a nut.

The drive member may be rotated to drive the urging member. The urging member may be provided on the internally threaded member so that when the internally threaded member is so driven, the internally threaded member drives the urging member.

One embodiment of the securing device may comprise at least one holding element on the body for holding the article. The securing device may comprise a plurality of holding elements on the body for holding the article.

The, or each, holding element may define a recess to receive an edge region of the article. The edge region may be the aforesaid edge region around the hole.

The, or each, holding element may comprise a snap fit element that can receive said edge region.

The holding element may be deformable to allow the holding element to deform from a non-deformed condition on engagement by said edge region. The holding element may return to said non-deformed condition when said edge region is received in the recess.

The securing device may further include at least one engaging formation for engaging the edge region. The, or each, engaging formation may project from the body.

Thus, in the embodiments described herein the, or each, engaging formation can engage the article to provide frictional engagement with the aforesaid edge region. This provides the embodiments described herein with the advantage in that the, or each, engaging formation frictionally engages the edge region around the hole thereby restricting rotation of the body as the drive member is rotated to drive the urging member.

According to yet another aspect of this invention, there is provided a suspension assembly comprising a securing device as described above and a mounting device on which the securing device is mounted.

The mounting device may comprise a clamping assembly. The clamping assembly may include a clamping member for clamping an elongate item, such as a wire, wire rope or cable. Alternatively, the mounting device may comprise a hook or a gripping arrangement.

Embodiments of the invention will now be described by way of example only, with reference to the accompanying drawings, in which.

Figure 1:
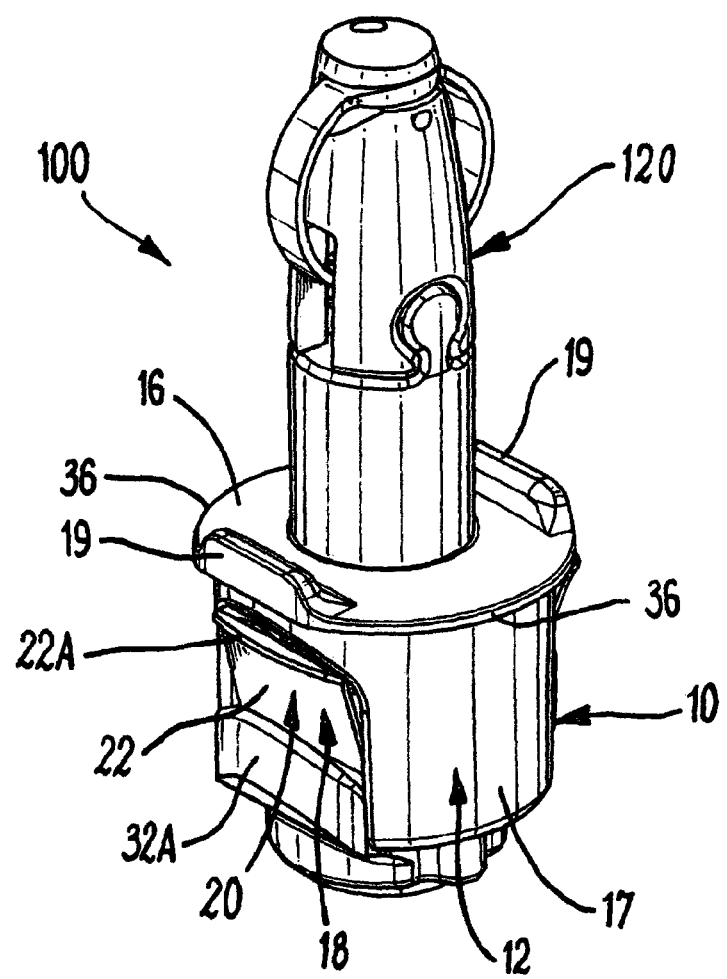
FIG. 1 is a perspective view of a suspension assembly incorporating a first embodiment of a securing device, having an indicator in a non-indicating condition.
Figure 2:
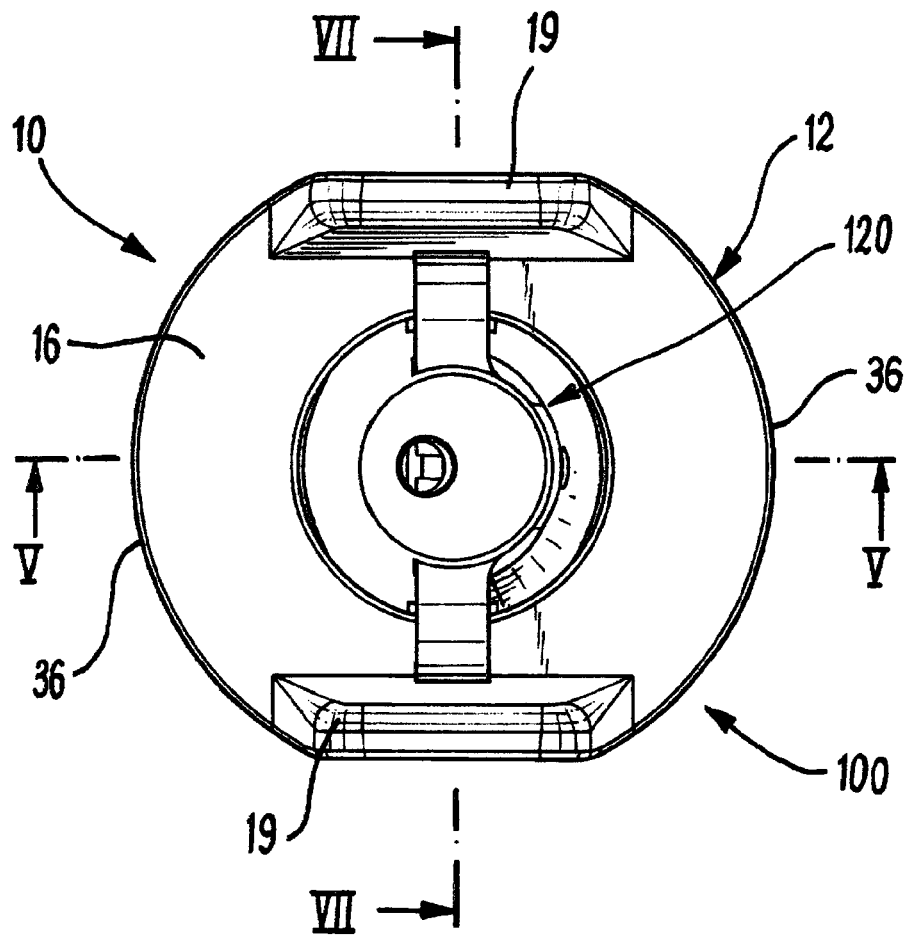
FIG. 2 is a top plan view of the suspension assembly shown in FIG. 1, showing the indicator in the non-indicating condition.
Figure 4:
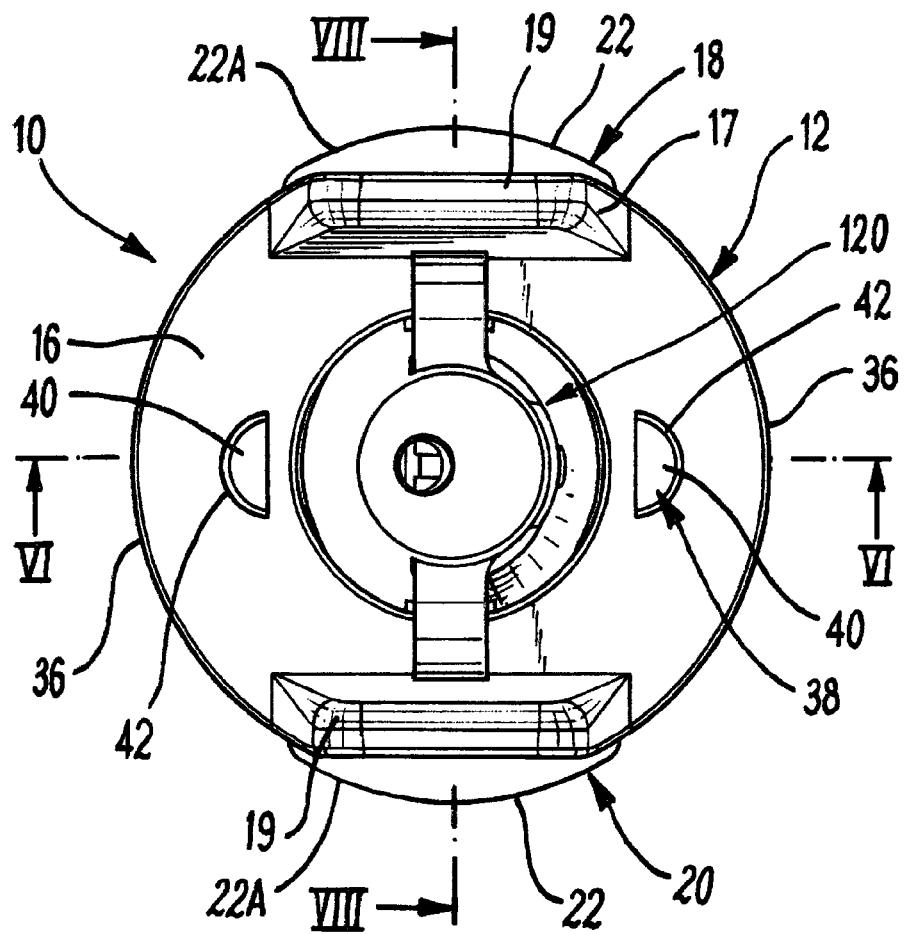
FIG. 4 is a top plan view of the suspension assembly shown in FIG. 1, with the indicator in the indicating condition.
Figure 5:
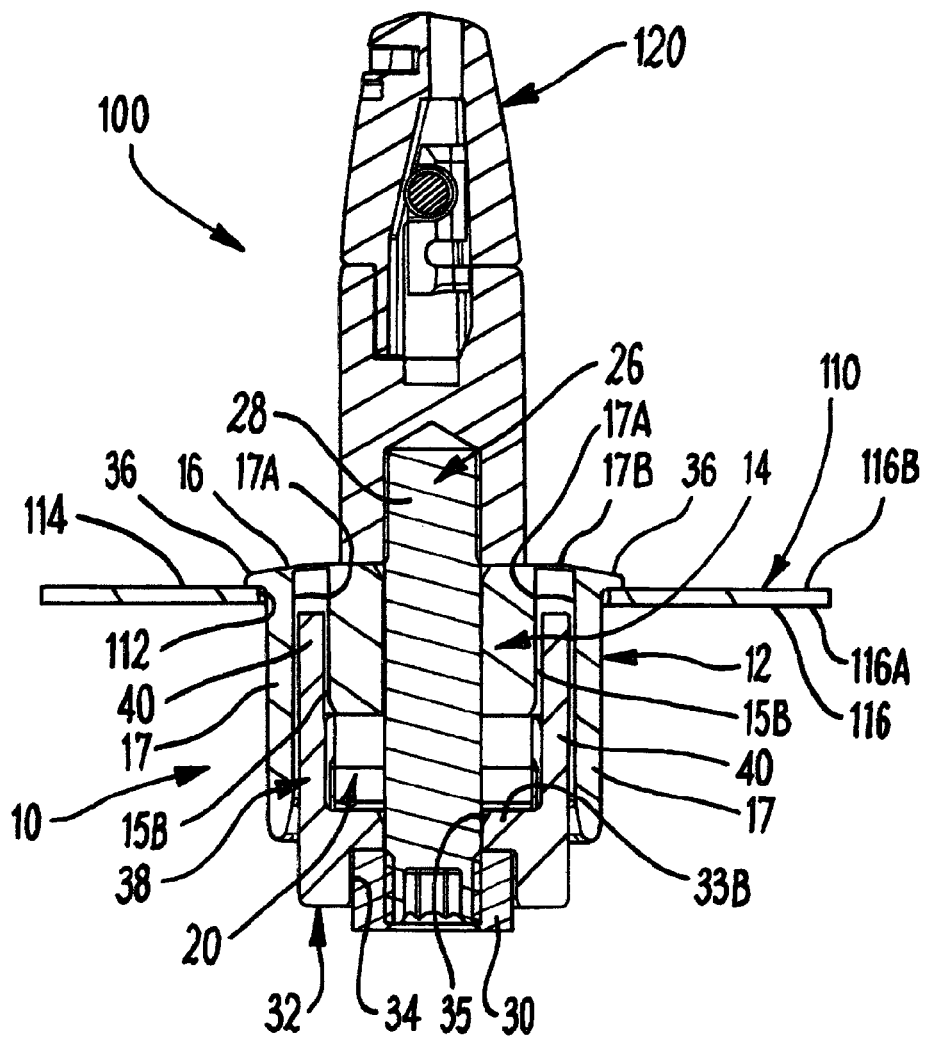
Figure 6:
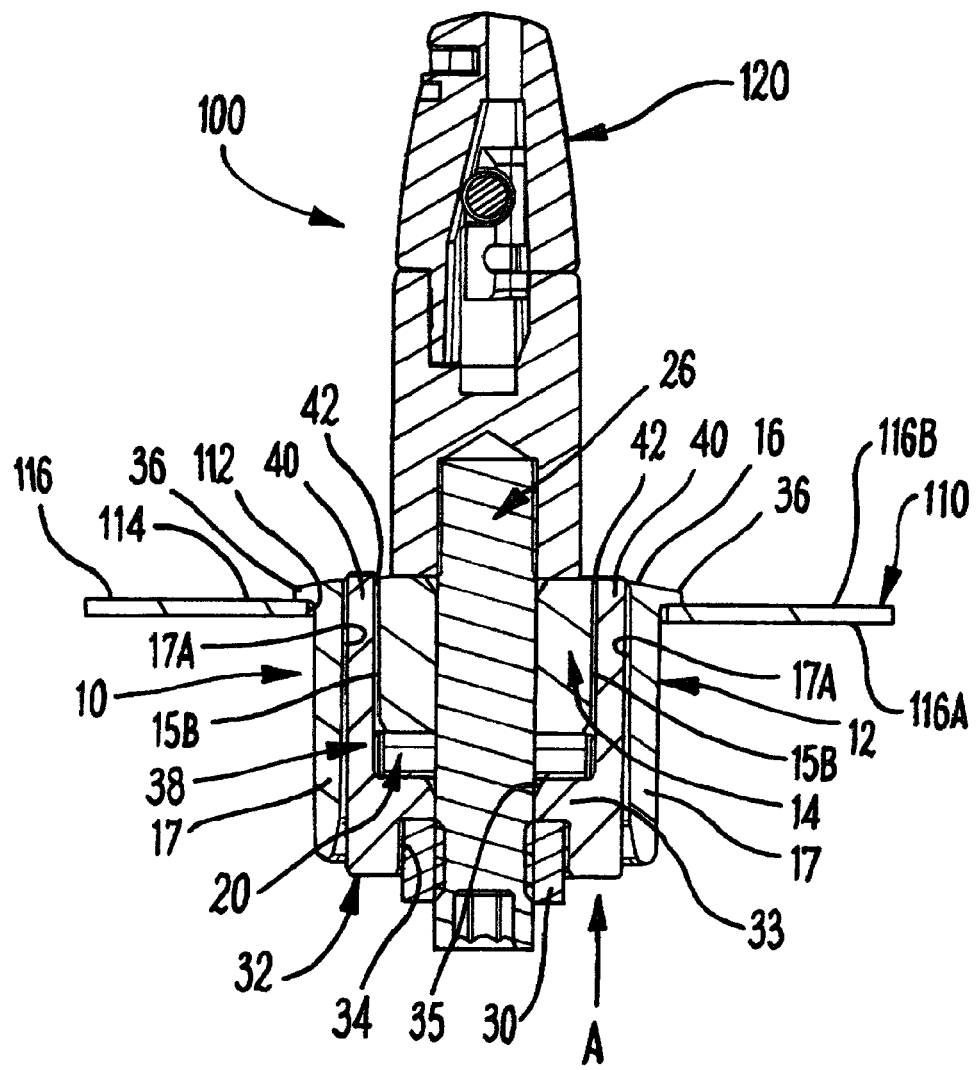
Figure 7:
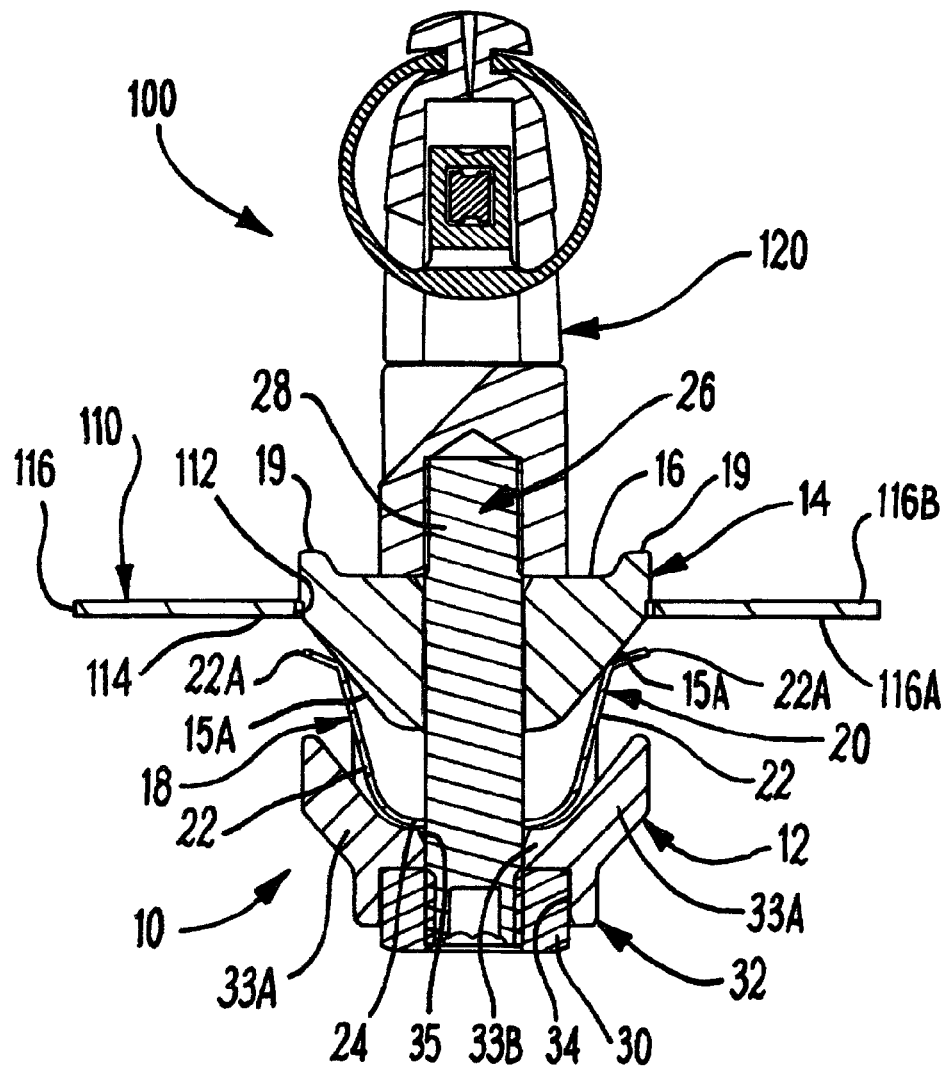
Figure 8:
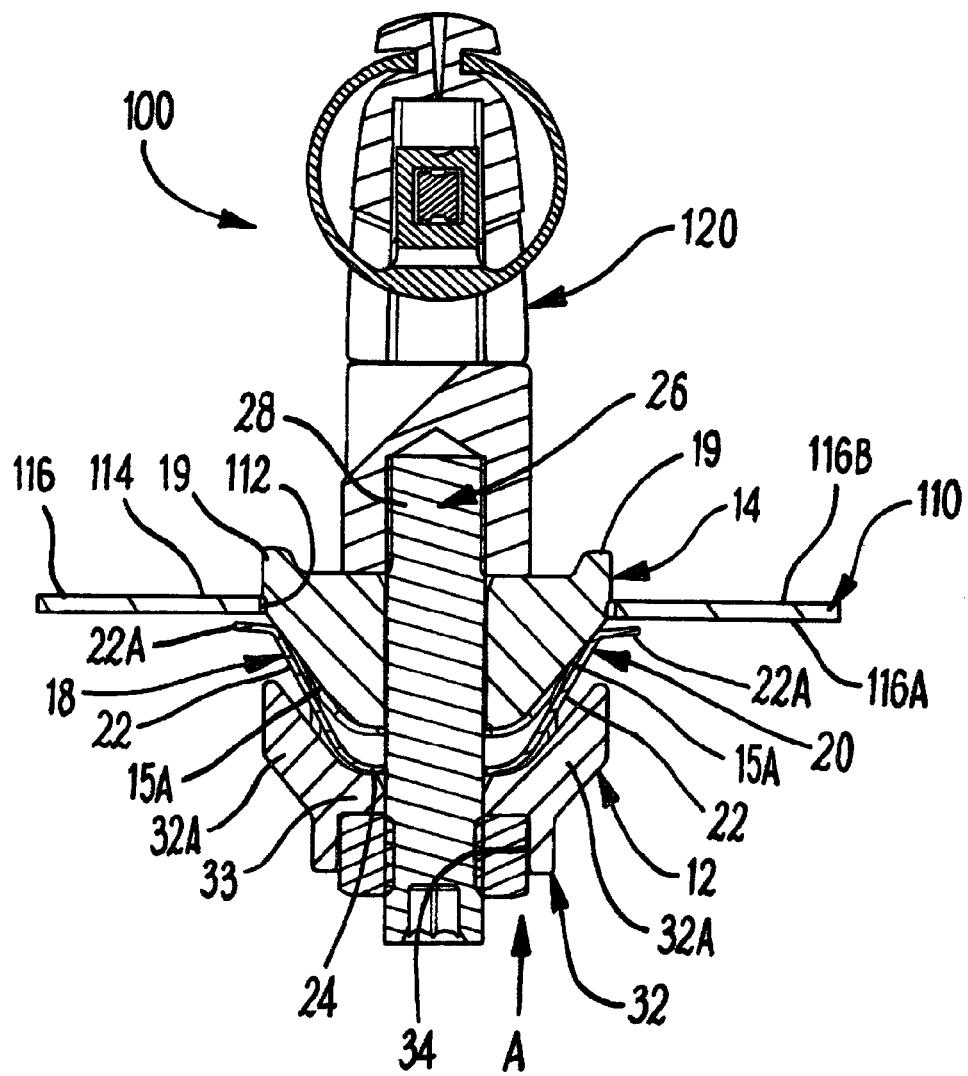
Figure 9:
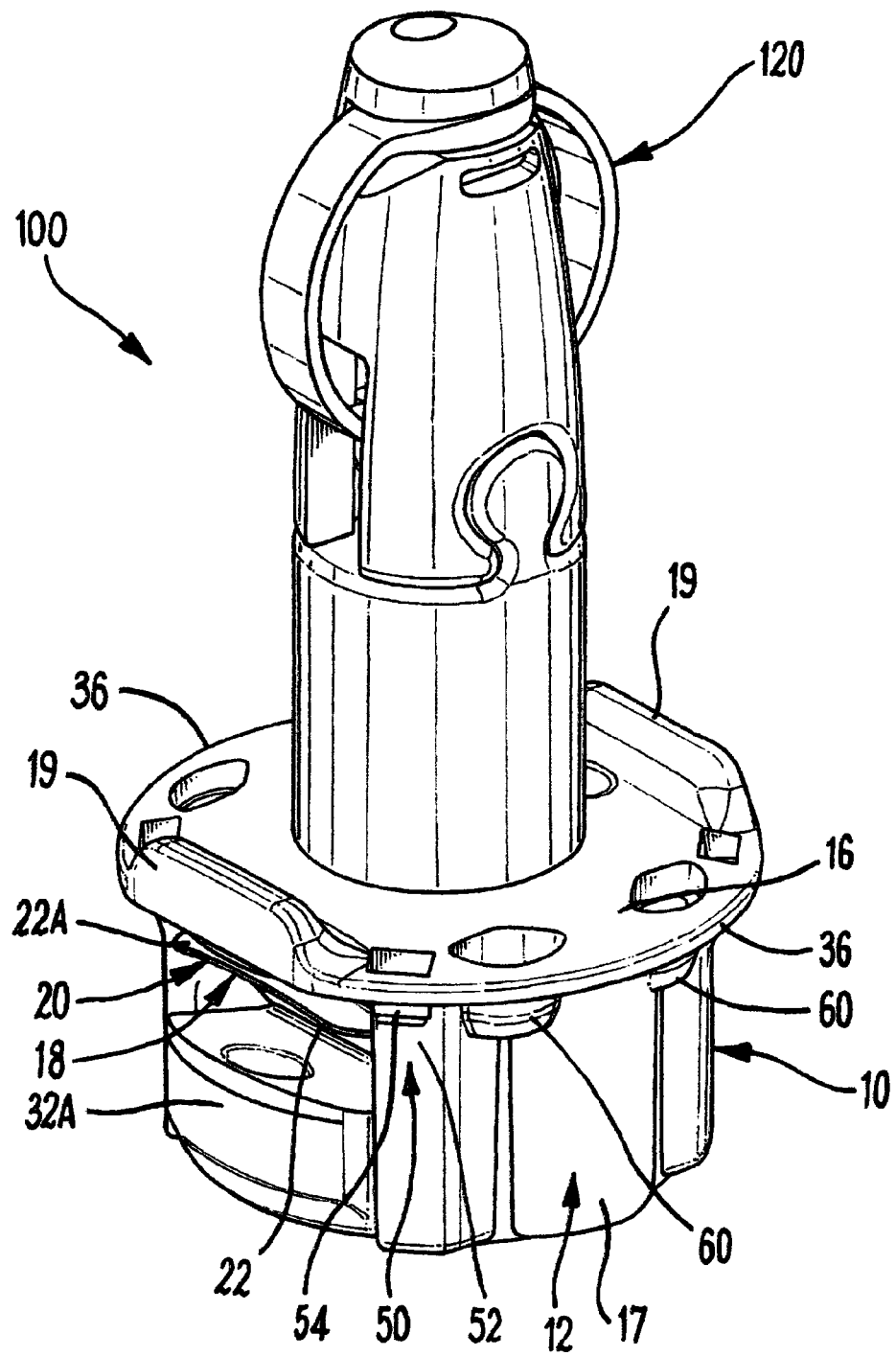
Figure 10:
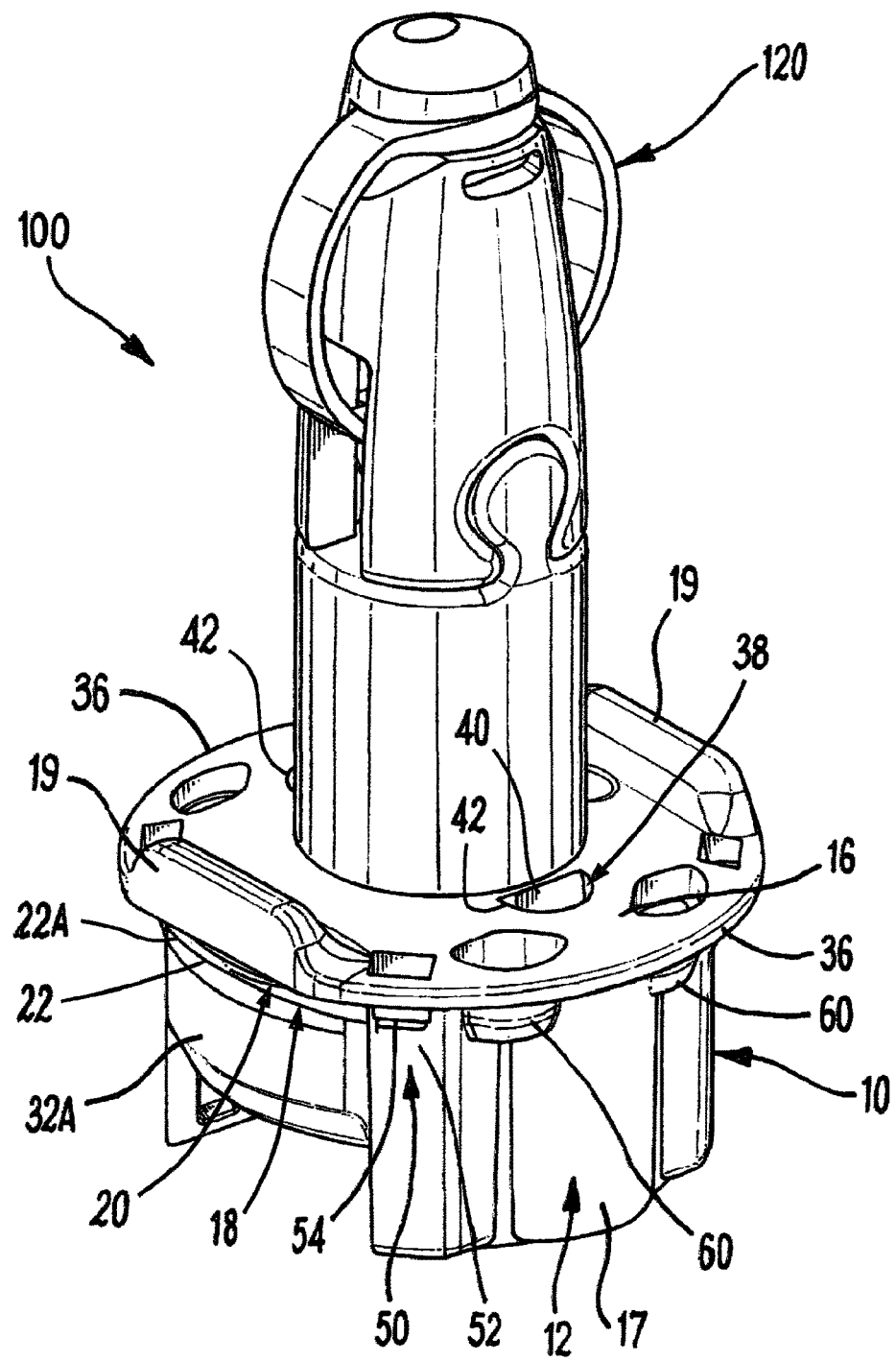
Figure 11:
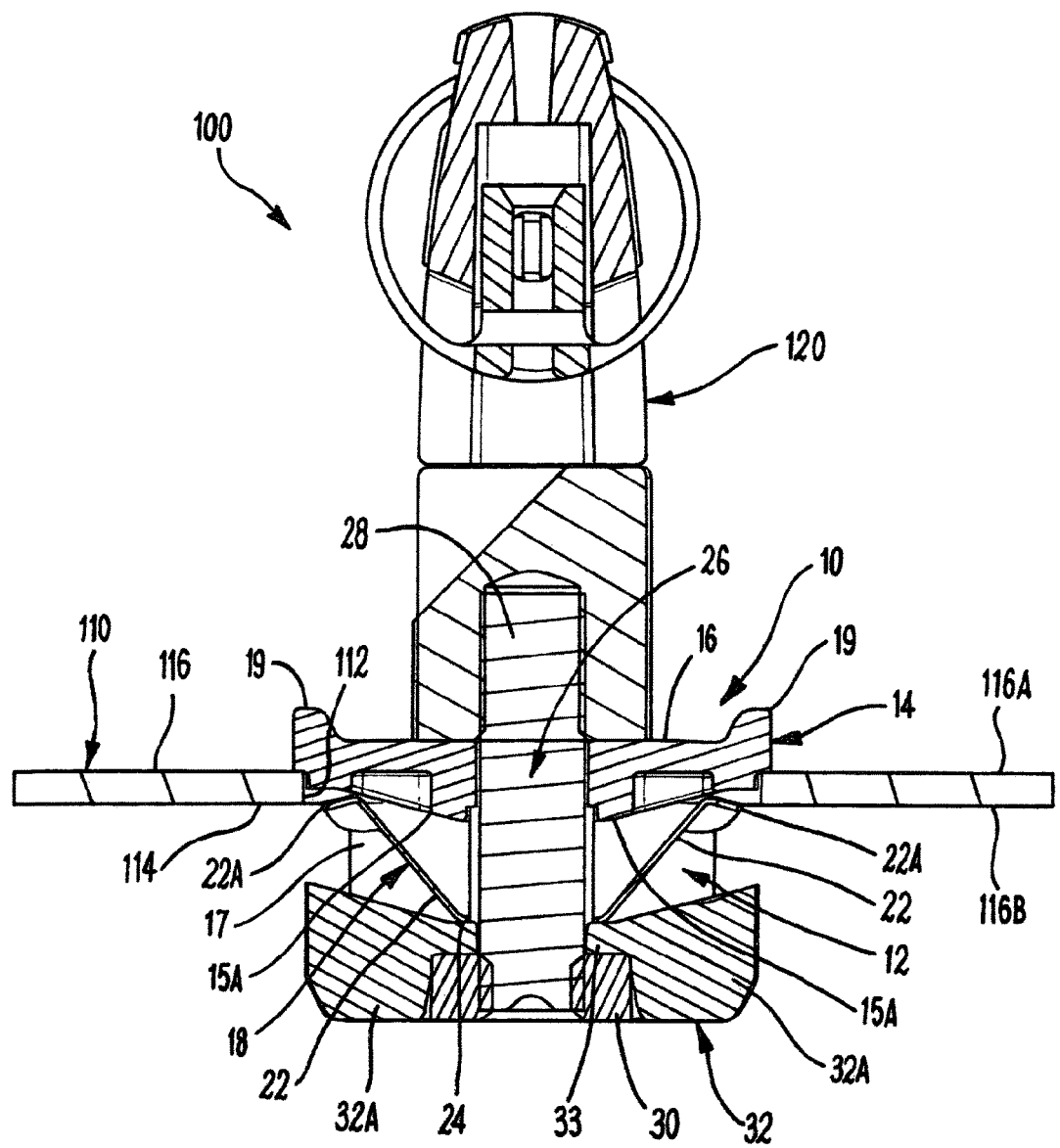
Figure 12:
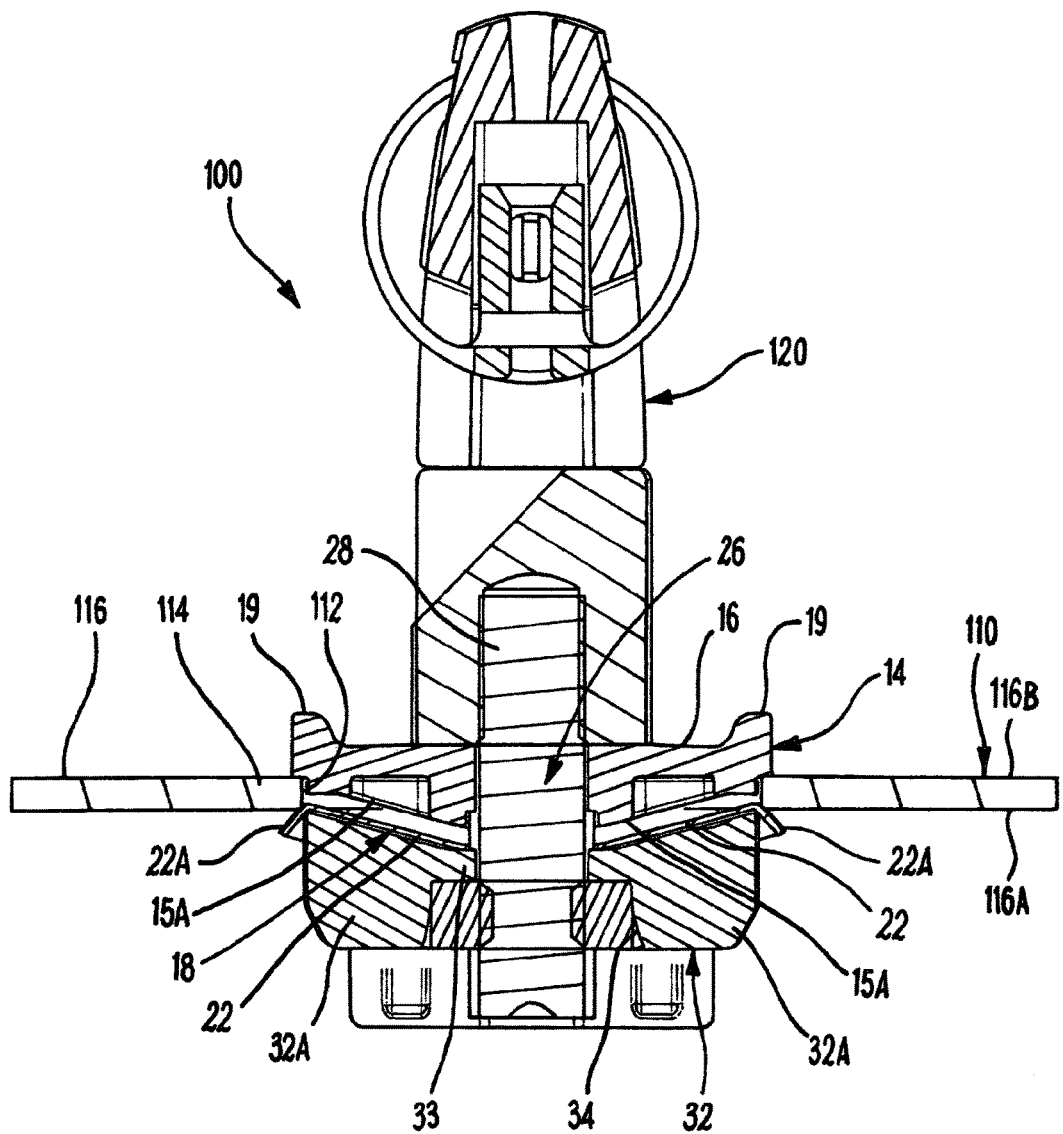
Figure 13:
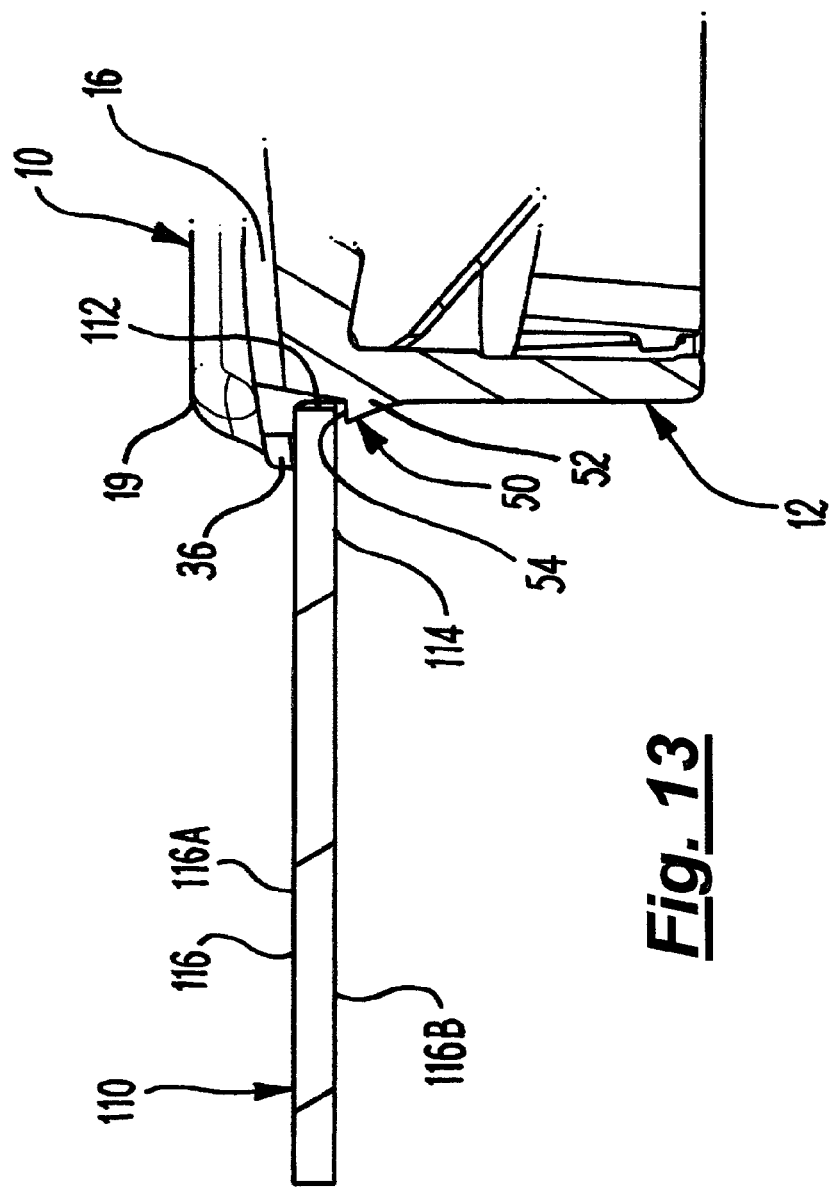
Figure 14A:
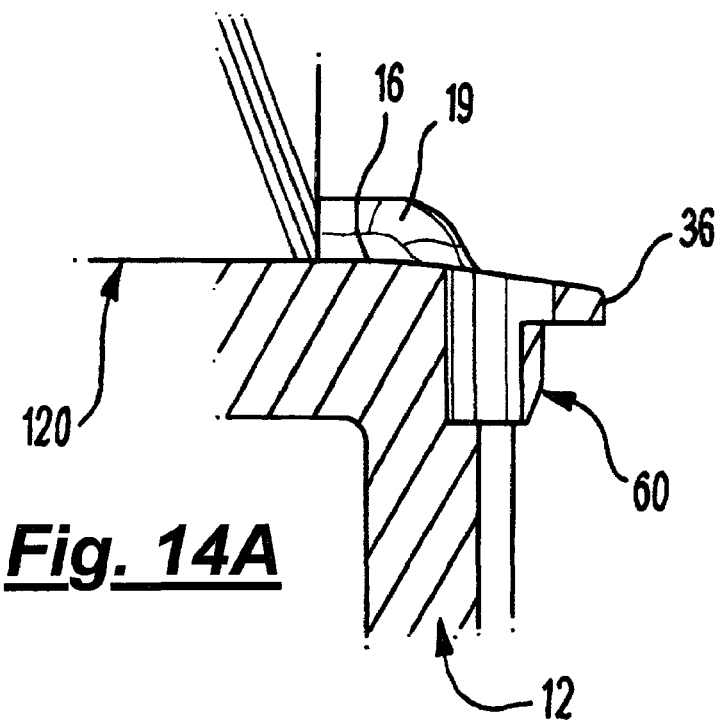
Figure 14B:
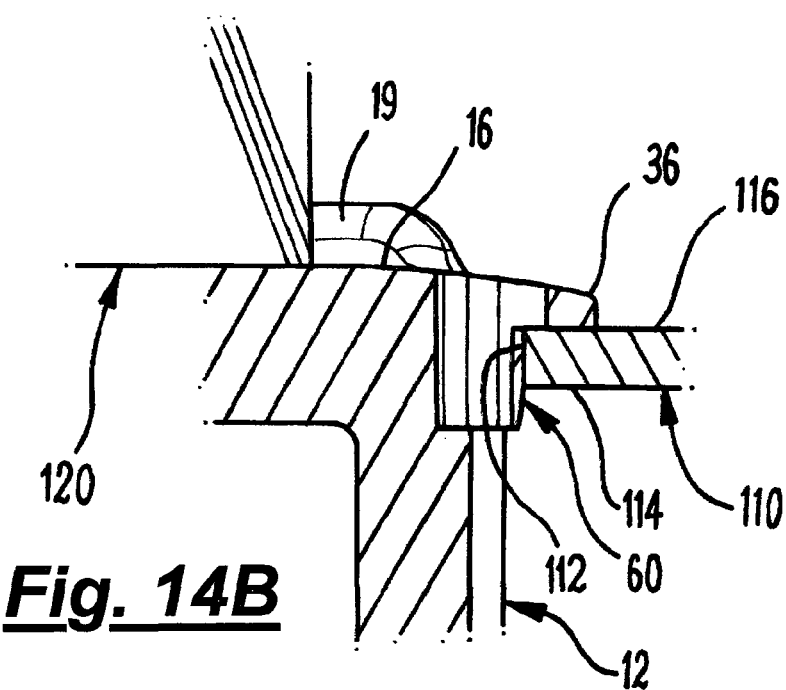

FIG. 5 is a view along the lines V-V in FIG. 2;
FIG. 6 is a view along the lines VI-VI in FIG. 4;
FIG. 7 is a view along the lines VII-VII in FIG. 2;
FIG. 8 is a view along the lines VIII-VIII in FIG. 4;
FIG. 9 is a view similar to FIG. 1 of a suspension assembly incorporating a second embodiment of a securing device, having the indicator in a non-indicating condition;
FIG. 10 is a view similar to FIG. 3 of the suspension assembly shown in FIG. 9, with the indicator in an indicating condition;
FIG. 11 is a view similar to FIG. 7 of the suspension assembly shown in FIGS. 9 and 10;
FIG. 12 is a view similar to FIG. 8 of the suspension assembly shown in FIGS. 9 and 10;
FIG. 13 is a close up view of a holding element being part of the second embodiment of the securing device;
FIG. 14A is a close up view of an engaging formation being part of the second embodiment of the securing device, showing the engaging formation in a non-compressed condition; and
FIG. 14B is a close up view similar to FIG. 14A, showing the engaging formation in a compressed condition engaging an article.

FIGS. 1 to 8 of the drawings show a suspension assembly 100 comprising a mounting device in the form of a clamping assembly 120. The suspension assembly further includes a securing device 10 attached to the clamping assembly 120.

The suspension assembly 100 is suitable for suspending an article 110 (see FIGS. 5 to 8), such as lighting apparatus, from a roof of a building by cables clamped by the clamping assembly 120. The securing device 10 is received in a hole 112 defined in an upper member 116 of the article 110 and is secured to the article 110 at edge regions 114 of the upper member 116 around the hole 112.

A suitable such clamping assembly is described in UK patent specification No. GB2509807. It will be appreciated that the securing device 10 could be mounted on any other suitable mounting device capable of being attached to the securing device 10, such as a hook or a gripping arrangement.

A first embodiment of the securing device 10 is shown in FIGS. 1 to 8, and comprises a body 12 having a guide formation 14 and a top portion 16 extending across the guide formation 14.

The guide formation 14 is of a substantially rectangular configuration having a pair of opposite sloping side faces 15A (see FIG. 7) and a pair of further side faces 15B (see FIGS. 6 and 7) extending downwardly substantially normally to the top portion 16. A pair of side walls 17 extends downwardly from the top portion 16.

Each side wall 17 is arranged adjacent a respective one of the further side faces 15B and defines a space 17A therebetween (see FIGS. 5 and 6). The cover portion includes a respective web 17B extending over each of the spaces 17A (see FIG. 5). The purpose of the space 17 is explained below. The sloping sides 15A provide guide tracks, as also explained below.

The securing device 10 further includes a fastening arrangement 18 comprising a resilient fastening member 20 in the form of a substantially U shaped spring. The fastening member 20 has two opposite flared portions 22 and a central portion 24. Each flared portion 22 has a tip portion 22A extending laterally outwardly for engaging the underside 116A of the upper member 116 of the article 110. The flared portions 22 extend from the central portion 24 towards the guide formation 14, and flare outwardly from the central portion 24.

The securing device 10 further includes an urging arrangement 26 comprising an elongate externally threaded drive member 28 threadably attached at one end to an internally threaded member in the form of a nut 30. The drive member 28 is also threadably attached at the opposite end to the clamping assembly 120. The drive member 28 can be rotated by rotating the clamping assembly 120.

The urging arrangement 26 further includes an urging member 32 on the nut 30. The urging member 32 defines a recess 34 in which the nut 30 is tightly received.

The central portion 24 of the fastening member 20 is seated on the central member 33B of the urging member 32.

Thus, rotation of the drive member 28 relative to the nut moves the nut 30 along the drive member 28 and, thereby, also moves the urging member 32 along the drive member 28.

The urging member 32 comprises a pair of upwardly extending wing members 33A and a central member 33B (see FIG. 7). The central member 33B defines an aperture 35 through which the threaded drive member 28 extends.

The wing members 33A extend from the central member 33B on opposite sides thereof. The wing members 32A are aligned with the flared portions 22 of the fastening member 20.

The top portion 16 includes a pair of flanges 36 which extend radially outwardly beyond the side walls 17 to engage the article 110 on a top side 110B thereof, opposite the underside 110A. Thus, the upper member 116 of the article 110 is gripped between the tip portions 22A of the flared portions 22 and the flanges 36 of the top portion 16.

The securing device 10 further includes an indicator 38 comprising a pair of indicating members in the form of prongs 40. Each prong 40 is provided on the central member 33B of the urging member 32 on a respective opposite side of the guide formation 14.

The prongs 40 are disposed between the wing members 33A. Each prong 40 extends from the central member 33B upwardly into a respective one of the spaces 17A towards the top portion 16.

Tightening members in the form of lugs 19 extend upwardly from the guide formation 14. The lugs 19 are provided to assist the user in moving the fastening member 20 to a fastening position, the lugs 19 being held by the user when the user rotates the clamping assembly 120, thereby rotating the drive member 28.

FIGS. 1 and 2 show the suspension assembly 100, in which fastening arrangement 18 of the securing device 10 is in a non-fastening position and the indicator 38 in a non-indicating condition.

In FIGS. 1 and 2, the fastening member 20 is retracted into the body 12. As a result, the tip portions 22A do not project beyond the body 12 and are not visible in FIG. 2. In addition, the prongs 40 have not punctured the cover portions 16 and are not visible in FIGS. 1 and 2.

Figure 3:
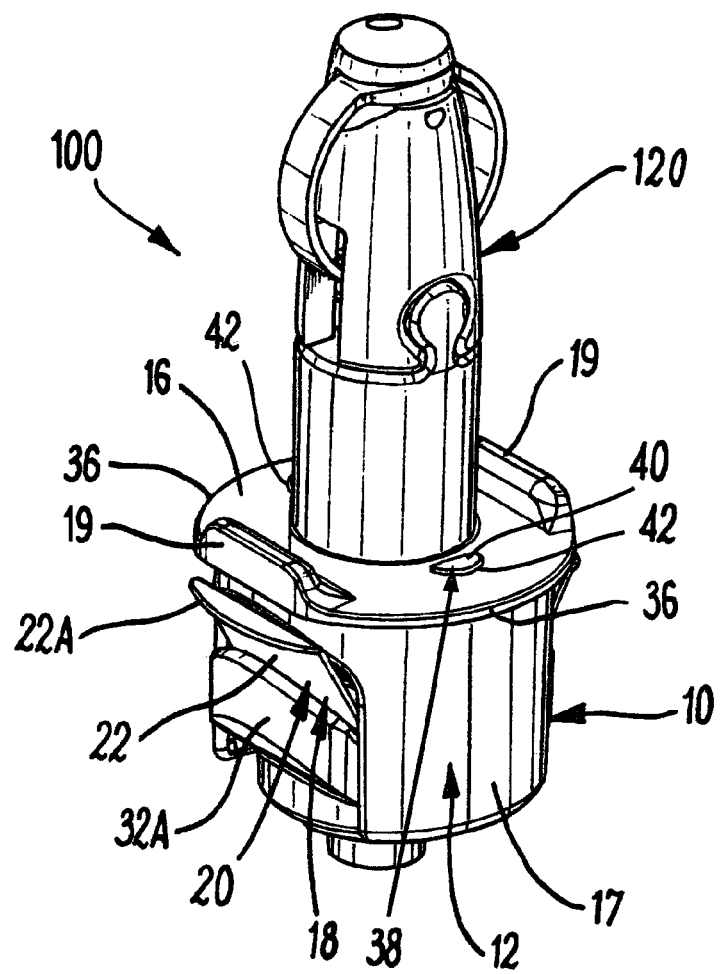
FIG. 3 is a perspective view of the suspension assembly shown in FIG. 1, with the indicator in an indicating condition.

FIGS. 3 and 4 also show the suspension arrangement 100, but in FIGS. 3 and 4, the fastening arrangement 18 is in a fastening position and the indicator 38 is in an indicating condition. In FIGS. 3 and 4, the fastening member projects beyond the body 12, and is visible in FIG. 4.

In use, the suspension assembly 100 is lowered into the hole 112 in the upper member 116 so that the body 12 of the securing device 10 is received through the hole 112. The suspension assembly 100 is lowered until the flanges 36 engage the top side 116B of the upper member 116 at the edge region 114 around the hole 112.

The lugs 19 are gripped by the user, who then rotates the clamping assembly 120. The drive member 28 is secured to the clamping assembly 120, as shown in FIGS. 5 to 8. Thus, rotation of the clamping assembly 120 causes corresponding rotation of the drive member 28.

By rotating the clamping assembly 120 in a clockwise direction (when looking down on the clamping assembly, for example as shown in FIGS. 2 and 4), the drive member 28 is screwed into the nut 30, thereby moving the nut 30 and the urging member 32 upwardly along the drive member 28, as shown by the arrow A in FIGS. 6 and 8.

This movement of the urging member 32 causes the urging member 32 to urge the fastening member 20 upwardly so that the flared portions 22 slide along the sloping sides 15A of the guide formation 14, thereby causing the flared portions 22 to flare further outwardly.

The rotation of the drive member 28 is continued until the fastening member 20 reaches a fastening position in which the tip portions 22A engage the underside 116A of the upper member 116 of the article 110, thereby gripping the upper member 116 of the article 110 between the tip portions 22A and the flanges 36.

When the drive member 28 is rotated to urge the fastening member 20 towards the fastening position, the indicator 38 is urged towards the top portion 16. Continued rotation of the drive member 28 drives the urging member 32 to urge the indicator 38 to an indicating condition.

In the indicating condition, the web 17B of the top portion 16 is punctured by both prongs 40 so that the top portion 16 defines two perforations 42. When the top portion 16 is punctured in this way, the prongs 40 protrude through the perforations 42 as shown in FIGS. 3, 4 and 6. This indicates to the user that the fastening member 20 is in its fastening position. The prongs 40 may be a bright colour, for example red, thereby being easily visible when the indicator 38 reaches the indicating condition.

FIGS. 9 to 14B show the suspension assembly 100 which includes a second embodiment of the securing device 10. The second embodiment of the securing device 10 shown in FIGS. 9 to 14B comprises many of the features of the first embodiment of the securing device 10 shown in FIGS. 1 to 8. These features have been given the same reference numerals in FIGS. 9 and 10 as the corresponding features in FIGS. 1 to 8.

The second embodiment of the securing device 10 shown in FIGS. 9 to 12 differs from the embodiment shown in FIGS. 1 to 8 in that it includes a plurality of holding elements in the form of snap fit elements 50 for holding the securing device 10 on the article 110. The snap fit elements 50 are shown in FIGS. 9 and 10.

Each snap fit element 50 comprises a deformable portion 52 which deforms from a non-deformed condition to a deformed condition as the securing device 10 is received in the hole 112 in the article 110. Each snap fit element 52 defines a recess 54 to receive the edge regions 114 of the article 110 around the hole 112.

As the securing device 10 is inserted into the hole 112 in the article 110, the edge regions 114 of the article 110 around the hole 112 engage the snap fit elements 50 and deform the snap fit elements 50 inwardly, thereby compressing the snap fit elements 50 to a deformed condition.

On further insertion of the securing device 10 into the hole 112, the deformable portion 52 of each snap fit element 50 moves over and beyond the edge regions 114, thereby causing the edge regions 114 to be received in the recesses 54.

When so received, the deformable portion 52 snaps back to its non-deformed condition, thereby holding the securing device 10 on the article 110.

FIG. 13 shows one of the snap fit elements 50 holding the upper member 116 of the article 110 at the edge region 14 around the hole 112.

The second embodiment of the securing device 10 further includes a plurality of engaging formations 60 on the body 12 for engaging the edge region 114 of the hole 112. The engaging formations 60 are shown in FIGS. 9, 10 14A and 14B.

The engaging formations 60 project from the body 12 and thereby provide frictional engagement with the aforesaid edge region 114 of the article 110 around the hole 112. This provides the advantage in the second embodiment that the plurality of engaging formations 60 frictionally engages the edge region 114 around the hole 112, thereby restricting rotation of the body 12 as the drive member 28 is rotated to drive the urging member 32.

When the engaging formations 60 engage the edge region 114, the engaging formations are compressed by the frictional engagement of the edge region 114 with the engaging formations 60.

FIG. 14A shows one of the engaging formations 60 in a non-compressed condition before engaging the edge region 114 around the hole 112. FIG. 14B shows the same engaging formation 60 in engagement with the edge region 114, in which the engaging formation 60 is shown in a compressed condition.

FIGS. 13, 14A and 14B also show the flanges 36 in engagement with the top side 116B of the upper member 116.

FIGS. 11 and 12 show the securing of the second embodiment of the securing device 10 to the article. The fastening member 22 has a V shaped profile.

The body 12 is shallower in the second embodiment than in the first embodiment, and the angle of the sloping sides 15A is less in the second embodiment than in the first embodiment.

The invention claimed is:

1. A securing device mountable on an article, the securing device comprising:
   a body, the body comprising a guide formation;
   a fastening arrangement movable relative to the guide formation to fasten the article to the securing device;
   an urging arrangement operable to urge the fastening arrangement relative to the guide formation between fastening and non-fastening positions, wherein the guide formation is arranged to guide the fastening arrangement to the fastening position;
   an indicator movable by the urging arrangement from a non-indicating condition to an indicating condition when the fastening arrangement is moved to the fastening position, wherein the body defines a space through which the indicator can move from the non-indicating to the indicating conditions;
   a web extending across the space, wherein the indicator extends through the web when the indicator is in the indicating condition;
   wherein the fastening arrangement comprises a resilient fastening member movable between the aforesaid fastening and non-fastening positions, the fastening member being configured to engage the article when the fastening member is in the fastening position.

2. A securing device according to claim 1, wherein the urging arrangement comprises a drive arrangement and an urging member, the drive arrangement being operable to drive the urging member, the urging member engaging the fastening arrangement so that when the drive arrangement drives the urging member, the urging member urges the fastening arrangement from the non-fastening position to the fastening position.

3. A securing device according to claim 2, wherein the drive arrangement comprises a drive member, and the urging member is mounted on the drive member.

4. A securing device according to claim 3, wherein the urging member receives the drive member therethrough and the fastening arrangement is seated on the urging member.

5. A securing device according to claim 3, wherein the drive member comprises an elongate threaded member, and the drive arrangement further includes a nut threadably mounted on the drive member, the nut being configured to be driven by the drive member.

6. A securing device according to claim 1, wherein the indicator comprises an indicating member movable along the space, and the indicating member extends through the web when the indicator is in the indicating condition.

7. A securing device according to claim 6, wherein the indicating member punctures the web when the indicator moves to the indicating condition.

8. A securing device according to claim 6, wherein the indicating member is provided on the urging member.

9. A securing device according to claim 1, wherein the body includes at least one outwardly extending portion aligned with the fastening member, whereby when the fastening arrangement is in the fastening position, the article can be gripped between the fastening member and the, or each, outwardly extending portion.

10. A securing device according to claim 1, wherein the, or each, outwardly extending portion comprises a radially outwardly extending flange.

11. A securing device according to claim 1, wherein the fastening member is substantially V or U shaped.

12. A securing device according to claim 1, wherein the fastening member has opposite end portions, each of which is urged outwardly in an opposite direction to the other by the guide formation when the fastening member is moved to the fastening position.

13. A securing device according to claim 12, wherein the guide formation has opposite sloping sides for engaging the end portions of the fastening member, and wherein the fastening member slides along the guide formation when the fastening member moves to the fastening position.

14. A securing device according to claim 1, comprising at least one holding element on the body for holding the article, wherein the, or each, holding element defines a recess to receive an edge region of the article.

15. A securing device according to claim 14, wherein the, or each, holding element comprises a snap fit element that can receive said edge region of the article.

16. A securing device according to claim 14, wherein the holding element is deformable to allow the holding element to deform from a non-deformed condition on engagement by said edge region around the hole, and wherein the holding element returns to said non-deformed condition when said edge region is received in the recess.

17. A securing device mountable on an article, the securing device comprising:
   a body, the body comprising a guide formation;
   a fastening arrangement movable relative to the guide formation to fasten the article to the securing device;
   an urging arrangement operable to urge the fastening arrangement relative to the guide formation between fastening and non-fastening positions, wherein the guide formation is arranged to guide the fastening arrangement to the fastening position;
   an indicator movable by the urging arrangement from a non-indicating condition to an indicating condition when the fastening arrangement is moved to the fastening position, wherein the body defines a space through which the indicator can move from the non-indicating to the indicating conditions;
   a web extending across the space, wherein the indicator extends through the web when the indicator is in the indicating condition;
   at least one engaging formation for engaging the edge region of the article, the, or each, engaging formation projecting from the body to provide frictional engagement with the aforesaid edge region.

18. A securing device according to claim 1, comprising tightening members to assist in moving the fastening arrangement to the fastening position, the tightening members being provided on the guide formation in alignment with the end portions of the fastening member.

19. A suspension assembly comprising a securing device and a mounting device on which the securing device is mounted, the securing device comprising:
- a body, the body comprising a guide formation;
- a fastening arrangement movable relative to the guide formation to fasten an article to the securing device;
- an urging arrangement operable to urge the fastening arrangement relative to the guide formation between fastening and non-fastening positions, wherein the guide formation is arranged to guide the fastening arrangement to the fastening position;
- an indicator movable by the urging arrangement from a non-indicating condition to an indicating condition when the fastening arrangement is moved to the fastening position, wherein the body defines a space through which the indicator can move from the non-indicating to the indicating conditions;
- a web extending across the space, wherein the indicator extends through the web when the indicator is in the indicating condition.

* * * * *